US012760249B2

(12) United States Patent
Clarke et al.

(10) Patent No.: US 12,760,249 B2
(45) Date of Patent: Oct. 13, 2026

(54) CLEANSING COMPOSITIONS COMPRISING A FATTY ACID AND SOAP MIXTURE AND METHOD FOR MAKING A CLEANSING BAR COMPRISING SAID MIXTURE

(71) Applicant: Conopco, Inc., Englewood Cliffs, NJ (US)

(72) Inventors: Michael Gerard Clarke, Chesire, CT (US); Elizabeth Joy Spencer, Southbury, CT (US); Terence James Farrell, Sandy Hook, CT (US)

(73) Assignee: Conopco, Inc., Hoboken, NJ (US)

( * ) Notice: Subject to any disclaimer, the term of this patent is extended or adjusted under 35 U.S.C. 154(b) by 227 days.

(21) Appl. No.: 18/034,905

(22) PCT Filed: Oct. 19, 2021

(86) PCT No.: PCT/EP2021/078917
§ 371 (c)(1),
(2) Date: May 2, 2023

(87) PCT Pub. No.: WO2022/096257
PCT Pub. Date: May 12, 2022

(65) Prior Publication Data

US 2024/0018450 A1 Jan. 18, 2024

(30) Foreign Application Priority Data

Nov. 9, 2020 (EP) .................................... 20206522

(51) Int. Cl.

| | |
|---|---|
| ***C11D 1/00*** | (2006.01) |
| ***C11D 1/90*** | (2006.01) |
| ***C11D 1/92*** | (2006.01) |
| ***C11D 10/04*** | (2006.01) |
| ***C11D 13/02*** | (2006.01) |
| ***C11D 13/12*** | (2006.01) |
| ***C11D 13/16*** | (2006.01) |
| ***C11D 13/20*** | (2006.01) |
| ***C11D 13/22*** | (2006.01) |
| ***C11D 17/00*** | (2006.01) |

(52) U.S. Cl.
CPC ................ *C11D 10/04* (2013.01); *C11D 1/90* (2013.01); *C11D 1/92* (2013.01); *C11D 13/02* (2013.01); *C11D 13/12* (2013.01); *C11D 13/16* (2013.01); *C11D 13/20* (2013.01); *C11D 13/22* (2013.01); *C11D 17/006* (2013.01)

(58) Field of Classification Search
None
See application file for complete search history.

(56) References Cited

U.S. PATENT DOCUMENTS

| | | | | |
|---|---|---|---|---|
| 3,376,229 | A | 4/1968 | Haas et al. | |
| 4,180,470 | A | 12/1979 | Tokosh et al. | |
| 5,009,814 | A | 4/1991 | Kelkenberg et al. | |
| 5,389,279 | A | 2/1995 | Au et al. | |
| 5,393,466 | A | 2/1995 | Ilardi et al. | |
| 5,540,852 | A * | 7/1996 | Kefauver ............... | C11D 9/007 510/491 |
| 5,658,574 | A | 8/1997 | Bahary et al. | |
| 5,866,144 | A | 2/1999 | Chopra et al. | |
| 6,444,630 | B1 | 9/2002 | Farrell et al. | |
| 2006/0089279 | A1 | 4/2006 | Brennan et al. | |
| 2006/0225285 | A1 | 10/2006 | Slavtcheff et al. | |
| 2013/0244923 | A1 | 9/2013 | Takahito et al. | |
| 2014/0342974 | A1 | 11/2014 | Nucci et al. | |

FOREIGN PATENT DOCUMENTS

| | | |
|---|---|---|
| EP | 0556957 | 8/1993 |
| JP | 09511248 | 11/1997 |
| WO | WO0158422 | 8/2001 |
| WO | WO2005068601 | 7/2005 |

OTHER PUBLICATIONS

Search Report and Written Opinion in EP20206522; May 10, 2021; European Patent Office (EPO).
Search Report and Written Opinion in PCTEP2021078917; Feb. 7, 2022; World Intellectual Property Org. (WIPO).

* cited by examiner

*Primary Examiner* — Necholus Ogden, Jr.
(74) *Attorney, Agent, or Firm* — Krista J. Aiello

(57) ABSTRACT

A cleansing composition includes 25% to 35% by weight of a surfactant, 1.5% to 5% by weight of a co-surfactant, 5% to 9% by weight of water; and 50% to 60% by weight of a fatty acid and soap mixture, wherein the fatty acid to soap ratio is 2.3:1 to 1.8:1. A method of making cleansing bars includes heating the cleansing composition to a temperature sufficient to provide a molten composition, cooling the molten composition to form flakes and/or chips, refining the flakes and/or chips to form billets, and stamping and/or cutting the billets to form the cleansing bars. Another method of making cleansing bars includes heating the cleansing composition to a temperature sufficient to provide a molten composition, pouring the molten composition into a mold, cooling the molten composition until the cleansing bars are formed, and removing the cleansing bars from the mold.

18 Claims, No Drawings

CLEANSING COMPOSITIONS COMPRISING A FATTY ACID AND SOAP MIXTURE AND METHOD FOR MAKING A CLEANSING BAR COMPRISING SAID MIXTURE

CROSS REFERENCE TO RELATED APPLICATIONS

The present application is a U.S. National Phase Application under 35 U.S.C. § 371 of International Application No. PCT/EP2021/078917, filed on Oct. 19, 2021, which claims priority to European Patent Application No. 20206522.3, filed on Nov. 9, 2020, the contents of which are incorporated herein in their entireties.

FIELD OF THE INVENTION

Disclosed herein is a cleansing composition. The cleansing composition includes less surfactant than other cleansing compositions giving a milder soap along with other benefits. The cleansing composition includes a surfactant, co-surfactant, water, and a fatty acid and soap mixture.

BACKGROUND OF THE INVENTION

Fatty acid soap is an efficient and inexpensive cleansing product but can also be harsh to skin. Short chain, e.g., $C_{14}$ and below, or $C_{12}$ and below and unsaturated long chain, e.g., sodium oleate, soaps provide good lather and detergency, but can also be harsh and drying to skin. Removal of more soluble, harsher carbon chains from soap chain distribution can decrease harshness but at the expense of desirable in-use properties for the consumer, such as speed to lather, lather volume and quality.

U.S. Patent Publication No. 2006/0225285 A1 to Slavtcheff et al. discloses a razor head assembly that contains a mild cleansing composition including acyl isethionate surfactant (s) positioned adjacent to a blade for shaving and treating the skin. The isethionate surfactants provide the user with nearly simultaneous moisturization, cleansing, and shaving. An after shave phase is provided in addition to the cleansing phase in a preferred embodiment.

To achieve milder bars, compositions may replace some or all of the fatty acid soap content with synthetic surfactants ("syndet" bars). Synthetic surfactants tend to be milder than soap but may still be harsh to skin due to high inclusion levels to achieve desirable lather for consumers. High surfactant levels' excellent detergency also prevents additional benefits being achieved through a bar composition, such as deposition of fragrance or skin-beneficial ingredients.

As such, there is continually a need for cleansing compositions that can minimize not only harsh surfactant but total surfactant overall. Balancing the content of these materials provides mildness and enhanced benefits such as moisturization and longer lasting fragrance while still being processable into a bar shape without sacrificing any user experience.

SUMMARY OF THE INVENTION

Disclosed in various aspects are cleansing compositions.

A cleansing composition comprises: 25% to 35% by weight of a surfactant, 1.5% to 5% by weight of a co-surfactant, 5% to 9% by weight of water; and 50% to 60% by weight of a fatty acid and soap mixture. The fatty acid to soap ratio is 2.3:1 to 1.8:1.

These and other features and characteristics are more particularly described below.

DETAILED DESCRIPTION OF THE INVENTION

The cleansing compositions disclosed herein relate to a solid cleansing bar composition. The cleansing composition is a balanced formulation consisting of surfactants, cosurfactants, fatty acids, soaps and optionally other miscellaneous ingredients. The cleansing composition is described as balanced since this unique composition provides clinical superiority to known compositions in market, provides cost benefits (by minimizing surfactant and leveraging stearic acid), and achieves both clinical and cost benefits without sacrificing lather hedonics expected with compositions utilizing a similar palette of ingredients. The cleansing compositions do not require any sacrifices to be made toward the consumer experience while executing superior skin benefits.

The ratio of fatty acid to soap as well as the incorporation levels of these two ingredients in final compositions are important features of the cleansing compositions disclosed herein. As solid syndets trend towards minimizing total surfactant levels, fatty acids and soaps would then constitute a significant portion of formulations and then by default significantly contribute to the composition's structure and hence its phase behavior and rheology. An unexpected benefit of this cleansing composition space is the phase behavior during the amalgamation of ingredients. Each unique composition may be processed in a molten state as either a doughy consistency or as a molten fluid (i.e., thin enough to pour). Either consistency, dough or fluid melt, can be crystallized, extruded and processed into a usable form. A secondary option for the fluid molten-state is to be poured into molds, crystallized and removed from molds as a usable form.

A unique feature of the cleansing compositions disclosed herein are the phase behavior of the cleansing compositions because at mixing temperatures where all materials are in a molten state, the formulation can exist as either a viscous dough or a thin, readily pourable liquid. Such phase behavior allows for manufacturing flexibility of the cleansing compositions such that a dough at high temperature (e.g., greater than 100° C.) can be cooled by flaking on a chill roll, belt flaking, milling, etc. and a liquid at high temperature (e.g., greater than 100° C.) can be cooled as detailed above, or can be processed via a melt case procedure where the molten material is poured into a mold to cool.

Furthermore, the inclusion of typical soap, i.e., neutralized fatty acids or saponified oils as typical in the art, has demonstrated to be an asset without imparting any negative impact on clinical performance. Maintaining fatty acid and soap ratios and achieving an appropriate final formulation pH mitigates any negative contributions with which soap would normally be associated (i.e., harsh, clinically inferior, products).

The cleansing composition can include a surfactant, specifically, the cleansing composition can include 25% to 35% by weight of the surfactant. The surfactant can be present in an amount of greater than 25% by weight and less than 35% by weight. The surfactant can be present in an amount of 26% to 32% by weight.

The cleansing composition can include a co-surfactant, specifically, the cleansing composition can include 1.5% to 5% by weight of the co-surfactant. The co-surfactant can be present in an amount of greater than or equal to 1.5% by weight and less than or equal to 5% by weight. The cosurfactant can be present in an amount of 2.0% to 4% by weight, for example, 2.5% to 3.5% by weight.

The surfactant and/or co-surfactant can be selected from an anionic surfactant, a zwitterionic surfactant, an amphoteric surfactant, or a combination thereof. The discussion which follows refers to the surfactant, the co-surfactant, or the surfactant and the co-surfactant. The surfactant and/or co-surfactant can contain $C_8$-$C_{18}$ alkyl groups, for example, $C_{12}$-$C_{16}$ alkyl groups, for example, $C_{10}$-$C_{14}$ alkyl groups, or mixtures thereof. For example, the surfactant and/or co-surfactant can contain $C_{10}$ alkyl groups, $C_{12}$ alkyl groups, $C_{14}$ alkyl groups, or any combination thereof.

When present, the anionic surfactant used can include aliphatic sulfonates, such as a primary alkane (e.g., $C_8$-$C_{22}$) sulfonate, primary alkane (e.g., $C_8$-$C_{22}$) disulfonate, C 8-$C_{22}$ alkene sulfonate, $C_8$-$C_{22}$ hydroxyalkane sulfonate or alkyl glyceryl ether sulfonate (AGS); or aromatic sulfonates such as alkyl benzene sulfonate. The anionic surfactant may also be an alkyl sulfate (e.g., $C_{12}$-$C_{18}$ alkyl sulfate) or alkyl ether sulfate (including alkyl glyceryl ether sulfates). Among the alkyl ether sulfates are those having the formula:

$$RO(CH_2CH_2O)_nSO_3M$$

wherein R is an alkyl or alkenyl having 8 to 18 carbons, preferably 12 to 18 carbons, n has an average value of at least 1.0, preferably less than 5, and most preferably 1 to 4, and M is a solubilizing cation such as sodium, potassium, ammonium or substituted ammonium.

The anionic surfactant may also be alkyl sulfosuccinates (including mono- and dialkyl, e.g., $C_6$-$C_{22}$ sulfosuccinates); alkyl and acyl taurates (often methyl taurates), alkyl and acyl sarcosinates, sulfoacetates, $C_8$-$C_{22}$ alkyl phosphates and phosphonates, alkyl phosphate esters and alkoxyl alkyl phosphate esters, acyl lactates, $C_8$-$C_{22}$ monoalkyl succinates and maleates, sulphoacetates, alkyl glucosides and acyl isethionates, and the like.

Sulfosuccinates may be monoalkyl sulfosuccinates having the formula:

$$R^1OC(O)CH_2CH(SO_3M)CO_2M;$$

and amide-MEA sulfosuccinates of the formula:

$$R^1CONHCH_2CH_2OC(O)CH_2CH(SO_3M)CO_2M$$

wherein $R^1$ ranges from $C_8$-$C_{22}$ alkyl.

Sarcosinates are generally indicated by the formula:

$R^2CON(CH_3)CH_2CO_2M$, wherein $R^2$ ranges from $C_8$-$C_{20}$ alkyl.

Taurates are generally identified by formula:

$$R^3CONR^4CH_2CH_2SO_3M$$

wherein $R^3$ is a $C_8$-$C_{20}$ alkyl, $R^4$ is a $C_1$-$C_4$ alkyl.

M is a solubilizing cation as previously described.

The cleansing composition disclosed herein may contain $C_8$-$C_{18}$ acyl isethionates. These esters are prepared by a reaction between alkali metal isethionate with mixed aliphatic fatty acids having from 6 to 18 carbon atoms and an iodine value of less than 20. At least 75% of the mixed fatty acids have from 12 to 18 carbon atoms and up to 25% have from 6 to 10 carbon atoms.

The acyl isethionate may be an alkoxylated isethionate such as is described in Ilardi et al., U.S. Pat. No. 5,393,466, entitled "Fatty Acid Esters of Polyalkoxylated isethonic acid; issued Feb. 28, 1995; hereby incorporated by reference. This compound has the general formula:

$$R^5C—(O)O—C(X)H—C(Y)H—(OCH_2—CH_2)_m—SO_3M$$

wherein $R^5$ is an alkyl group having 8 to 18 carbons, m is an integer from 1 to 4, X and Y are each independently hydrogen or an alkyl group having 1 to 4 carbons and M is a solubilizing cation as previously described.

In an aspect of the cleansing composition, the anionic surfactant used is 2-acrylamido-2-methylpropane sulfonic acid, ammonium lauryl sulfate, ammonium perfluorononanoate, potassium lauryl sulfate, sodium alkyl sulfate, sodium dodecyl sulfate, sodium laurate, sodium laureth sulfate, sodium lauroyl sarcosinate, sodium stearate, sodium sulfosuccinate esters, sodium lauroyl isethionate, or a combination thereof. Such anionic surfactants are commercially available from suppliers like Galaxy Surfactants, Clariant, Sino Lion, Stepan Company, and Innospec.

Optionally, amphoteric surfactants can be included in the cleansing compositions disclosed herein. Amphoteric surfactants (which depending on pH can be zwitterionic) include sodium acyl amphoacetates, sodium acyl amphopropionates, disodium acyl amphodiacetates and disodium acyl amphodipropionates where the acyl (i.e., alkanoyl group) can comprise a $C_7$-$C_{18}$ alkyl portion. Illustrative examples of amphoteric surfactants include sodium lauroamphoacetate, sodium cocoamphoacetate, sodium lauroamphoacetate, or a combination thereof.

As to the zwitterionic surfactants employed in the present cleansing composition, such surfactants include at least one acid group. Such an acid group may be a carboxylic or a sulphonic acid group. They often include quaternary nitrogen, and therefore, can be quaternary amino acids. They should generally include an alkyl or alkenyl group of 7 to 18 carbon atoms and generally comply with an overall structural formula:

$$R^6—[—C(O)—NH(CH_2)_q—_r]—N^+(R^7)(R^8)\text{-}A\text{-}B$$

where $R^6$ is alkyl or alkenyl of 7 to 18 carbon atoms; $R^7$ and $R^8$ are each independently alkyl, hydroxyalkyl or carboxyalkyl of 1 to 3 carbon atoms; q is 2 to 4; r is 0 to 1; A is alkylene of 1 to 3 carbon atoms optionally substituted with hydroxyl, and B is $—CO_2—$ or $—SO_3—$.

Desirable zwitterionic surfactants for use in the cleansing composition disclosed herein and within the above general formula include simple betaines of formula:

$$R^6—N^+(R^7)(R^8)—CH_2CO_2^-$$

and amido betaines of formula:

$$R^6—CONH(CH_2)_t—N^+(R^7)(R^8)—CH_2CO_2^-$$

where t is 2 or 3.

In both formulae $R^6$, $R^7$ and $R^8$ are as defined previously. $R^6$ may, in particular, be a mixture of $C_{12}$ and $C_{14}$ alkyl groups derived from coconut oil so that at least half, preferably at least three quarters of the groups $R^6$ have 10 to 14 carbon atoms. $R^7$ and $R^8$ are preferably methyl.

A further possibility is that the zwitterionic surfactant is a sulphobetaine of formula:

$$R^6—N^+(R^7)(R^8)—(CH_2)_3SO_3^- \text{ or}$$

$$R^6—CONH(CH_2)_u—N^+(R^7)(R^8)—(CH_2)_3SO_3^-$$

where u is 2 or 3, or variants of these in which $—(CH_2)_3SO_3^-$ is replaced by $—CH_2C(OH)(H)CH_2SO_3$.

In these formulae, $R^6$, $R^7$ and $R^8$ are as previously defined.

Illustrative examples of the zwitterionic surfactants desirable for use include betaines such as lauryl betaine, betaine citrate, cocodimethyl carboxymethyl betaine, cocoamidopropyl betaine, coco alkyldimethyl betaine, and laurylamidopropyl betaine. An additional zwitterionic surfactant suitable for use includes cocoamidopropyl sultaine, for example, cocamidopropyl hydroxysultaine. Preferred zwitterionic surfactants include lauryl betaine, betaine citrate, sodium hydroxymethylglycinate, (carboxymethyl) dimethyl-3-[(1-oxododecyl) amino] propylammonium hydroxide, coco alkyldimethyl betaine, (carboxymethyl) dimethyloleylammonium hydroxide, cocoamidopropyl betaine, (carboxymethyl) dimethyloleylammonium hydroxide, cocoamidopropyl betaine, (carboxylatomethyl) dimethyl (octadecyl)ammonium, cocamidopropyl hydroxysultaine, or a combination thereof. Such surfactants are made commercially available from suppliers like Stepan Company, Solvay, Evonik and the like and it is within the scope of the cleansing compositions disclosed herein to employ mixtures of the aforementioned surfactants.

Nonionic surfactants may optionally be used in the cleansing composition. When used, nonionic surfactants are typically used at levels as low as 0.5, 1, 1.5 or 2% by weight and at levels as high as 6, 8, 10 or 12% by weight. The nonionic surfactants which may be used include in particular the reaction products of compounds having a hydrophobic group and a reactive hydrogen atom, for example aliphatic alcohols, acids, amides or alkylphenols with alkylene oxides, especially ethylene oxide either alone or with propylene oxide. Specific nonionic surfactant compounds are alkyl ($C_6$-$C_{22}$) phenols, ethylene oxide condensates, the condensation products of aliphatic ($C_8$-$C_{18}$) primary or secondary linear or branched alcohols with ethylene oxide, and products made by condensation of ethylene oxide with the reaction products of propylene oxide and ethylenediamine. Other nonionic surfactants include long chain tertiary amine oxides, long chain tertiary phosphine oxides, dialkyl sulphoxides, and the like.

In an aspect, nonionic surfactants can include fatty acid/alcohol ethoxylates having the following structures a) $HOCH_2(CH_2)_s(CH_2CH_2O)_cH$ or b) $HOOC(CH_2)_v(CH_2CH_2O)_dH$; where s and v are each independently an integer up to 18; and c and d are each independently an integer from 1 or greater. In an aspect, s and v can be each independently 6 to 18; and c and d can be each independently 1 to 30. Other options for nonionic surfactants include those having the formula $HOOC(CH_2)_i—CH{=}CH—(CH_2)_k(CH_2CH_2O)_zH$, where i, k are each independently 5 to 15; and z is 5 to 50. In another aspect, i and k are each independently 6 to 12; and z is 15 to 35.

The nonionic surfactant may also include a sugar amide, such as a polysaccharide amide. Specifically, the surfactant may be one of the lactobionamides described in U.S. Pat. No. 5,389,279 to Au et al., entitled "Compositions Comprising Nonionic Glycolipid Surfactants issued Feb. 14, 1995; which is hereby incorporated by reference or it may be one of the sugar amides described in U.S. Pat. No. 5,009,814 to Kelkenberg, titled "Use of N-Poly Hydroxyalkyl Fatty Acid Amides as Thickening Agents for Liquid Aqueous Surfactant Systems" issued Apr. 23, 1991; hereby incorporated into the subject application by reference.

Illustrative examples of nonionic surfactants that can optionally be used in the cleansing compositions disclosed herein include, but are not limited to, polyglycoside, cetyl alcohol, decyl glucoside, lauryl glucoside, octaethylene glycol monododecyl ether, n-octyl beta-d-thioglucopyranoside, octyl glucoside, oleyl alcohol, polysorbate, sorbitan, stearyl alcohol, or a combination thereof.

In an aspect, cationic surfactants may optionally be used in the cleansing composition of the present application.

One class of cationic surfactants includes heterocyclic ammonium salts such as cetyl or stearyl pyridinium chloride, alkyl amidoethyl pyrrylinodium methyl sulfate, and lapyrium chloride.

Tetra alkyl ammonium salts are another useful class of cationic surfactants for use. Examples include cetyl or stearyl trimethyl ammonium chloride or bromide; hydrogenated palm or tallow trimethylammonium halides; behenyl trimethyl ammonium halides or methyl sulfates; decyl isononyl dimethyl ammonium halides; ditallow (or distearyl) dimethyl ammonium halides, and behenyl dimethyl ammonium chloride.

Still other types of cationic surfactants that may be used are the various ethoxylated quaternary amines and ester quats. Examples include PEG-5 stearyl ammonium lactate (e.g., Genamin KSL manufactured by Clariant), PEG-2 coco ammonium chloride, PEG-15 hydrogenated tallow ammonium chloride, PEG 15 stearyl ammonium chloride, dipalmitoyl ethyl methyl ammonium chloride, dipalmitoyl hydroxyethyl methyl sulfate, and stearyl amidopropyl dimethylamine lactate.

Still other useful cationic surfactants include quaternized hydrolysates of silk, wheat, and keratin proteins, and it is within the scope of the cleansing composition to use mixtures of the aforementioned cationic surfactants.

If used, cationic surfactants will make up no more than 1.0% by weight of the cleansing composition. When present, cationic surfactants typically make up from 0.01 to 0.7%, and more typically, from 0.1 to 0.5% by weight of the cleansing composition, including all ranges subsumed therein.

Particularly preferred surfactants for use in the present cleansing compositions include cocamidopropyl hydroxysultaine, cocamido sulfosuccinate, sodium lauroyl isethionate, or a combination thereof, most preferably the surfactant is sodium lauroyl isethionate, or a combination thereof.

Particularly preferred co-surfactants for use in the present cleansing compositions include cocamidopropyl betaine, sodium methyl cocoyl taurate, sodium cocoyl glycinate, sodium cocoyl glutamate, methyl ester sulfonate, fatty acid ester sulfonate, or a combination thereof.

The cleansing composition additionally comprises 5% to 9% by weight of water, for example greater than or equal to 5% by weight water and less than or equal to 9% by weight water. For example, the cleansing composition comprises 6% to 8% by weight water.

The cleansing composition also comprises 50% to 60% by weight of a fatty acid and soap mixture. A ratio of the fatty acid to soap can be 2.3:1 to 1.8:1. The high amount of fatty acid and soap mixture present allows for the amount of surfactant to be greatly reduced as compared to other formulations, without a loss in hedonics with a gain towards skin benefits.

The fatty acid can be selected from lauric acid, myristic acid, palmitic acid, stearic acid, behenic acid, oleic acid, linoleic acid, lanolic acid, isostearic acid, arachidonic acid, hydroxystearic acid, or a combination thereof, preferably the fatty acid is selected from stearic acid, palmitic acid, or a combination thereof.

The term "soap" is used here in its popular sense, i.e., salts of aliphatic alkane- or alkene monocarboxylic fatty acids preferably having 6 to 22 carbon atoms, and preferably 8 to 18 carbon atoms.

Typical of the soap salts are alkali metal or alkanol ammonium salts of such fatty acids, although other metal salts thereof, e.g., magnesium salts, may also be employed.

Sodium, potassium, magnesium, mono-, di- and tri-ethanol ammonium salts of such acids are among the desirable soaps for use herein.

The soap can be a neutralized fatty acid. The neutralized fatty acid can be selected from lauric acid, myristic acid, palmitic acid, stearic acid, behenic acid, oleic acid, linoleic acid, lanolic acid, isostearic acid, arachidonic acid, hydroxystearic acid, or a combination thereof, preferably the fatty acid is selected from stearic acid, palmitic acid, or a combination thereof.

The soap can comprise a mixture of lauric acid and an acid selected from myristic acid, palmitic acid, stearic acid, behenic acid, oleic acid, linoleic acid, lanolic acid, isostearic acid, arachidonic acid, hydroxystearic acid, or a combination thereof. When lauric acid is used, it can be present in an amount of 80% by weight in the fatty acid and soap mixture, for example, the lauric acid can be present in an amount of 85% by weight in the fatty acid and soap mixture. Lauric acid is generally rich in $C_{12}$ and includes coconut oil and/or palm kernel oil.

The cleansing composition can additionally include various additives including, but not limited to, colorants, emollients, anti-dandruff agents, skin feel agents, silicon oil, cationic polymers, or a combination thereof. Each of these substances may range from about 0.03 to about 5%, for example, 0.03 to 5%, preferably between 0.1 and 3% by weight of the total weight of the liquid 15 and composition, including all ranges subsumed therein. For example, colorants can be present in an amount of 5 parts per million (ppm) to 15 ppm, for example, about 15 ppm, for example, 15 ppm.

Additional optional ingredients which may be present in the subject personal cleansing 20 formulations are, for example: fragrances; sequestering and chelating agents such as tetrasodium ethylenediaminetetraacetate (EDTA), ethane hydroxyl diphosphonate (EHDP), and etidronic acid aka 1-hydroxyethylidene diphosphonic acid (HEDP); coloring agents; opacifiers and pearlizers such as zinc stearate, magnesium stearate, $TiO_2$, ethylene glycol monostearate (EGMS), ethylene glycol distearate (EGDS) or Lytron 621 (Styrene/Acrylate copolymer) and the like; pH adjusters; antioxidants, for example, butylated hydroxytoluene (BHT) and the like; stabilizers; suds boosters, such as for example, coconut acyl mono- or diethanol amides; ionizing salts, such as, for example, sodium chloride and sodium sulfate, and other ingredients such as are conventionally used in bar soap formulations. The total amount of such additional optional ingredients is typically from 0 to 10% by weight, more particularly from 0.1 to 5% by weight, based on the total weight of the personal cleansing formulation.

The compositions typically include one or more skin benefit agents. The term "skin benefit agent" is defined as a substance which softens or improves the elasticity, appearance, and youthfulness of the skin (stratum corneum) by either increasing its water content, adding, or replacing lipids and other skin nutrients, or both, and keeps it soft by retarding the decrease of its water content. Included among the suitable skin benefit agents are emollients, including, for example, hydrophobic emollients, hydrophilic emollients, or blends thereof.

Useful skin benefit agents include the following: (a) silicone oils and modifications thereof such as linear and cyclic polydimethylsiloxanes; amino, alkyl, alkylaryl, and aryl silicone oils; (b) fats and oils including natural fats and oils such as jojoba, soybean, sunflower, rice bran, avocado, almond, olive, sesame, persic, castor, coconut, and mink oils; cacao fat; beef tallow and lard; hardened oils obtained by hydrogenating the aforementioned oils; and synthetic mono, di and triglycerides such as myristic acid glyceride and 2-ethylhexanoic acid glyceride; (c) waxes such as carnauba, spermaceti, beeswax, lanolin, and derivatives thereof; (d) hydrophobic and hydrophilic plant extracts; (e) hydrocarbons such as liquid paraffin, petrolatum, microcrystalline wax, ceresin, squalene, pristan and mineral oil; (f) higher fatty acids such as lauric, myristic, palmitic, stearic, behenic, oleic, linoleic, linolenic, lanolic, isostearic, arachidonic and poly unsaturated fatty acids (PUFA); (g) higher alcohols such as lauryl, cetyl, stearyl, oleyl, behenyl, cholesterol and 2-hexydecanol alcohol; (h) esters such as cetyl octanoate, myristyl lactate, cetyl lactate, isopropyl myristate, myristyl myristate, isopropyl palmitate, isopropyl adipate, butyl stearate, decyl oleate, cholesterol isostearate, glycerol monostearate, glycerol monolaurate, glycerol distearate, glycerol tristearate, alkyl lactate, alkyl citrate and alkyl tartrate; (i) essential oils and extracts thereof such as mentha, jasmine, camphor, white cedar, bitter orange peel, ryu, turpentine, cinnamon, bergamot, citrus unshiu, calamus, pine, lavender, bay, clove, hiba, eucalyptus, lemon, starflower, thyme, peppermint, rose, sage, sesame, ginger, basil, juniper, lemon grass, rosemary, rosewood, avocado, grape, grapeseed, myrrh, cucumber, watercress, calendula, elder flower, geranium, linden blossom, amaranth, seaweed, ginko, ginseng, carrot, guarana, tea tree, jojoba, comfrey, oatmeal, cocoa, neroli, vanilla, green tea, penny royal, aloe vera, menthol, cineole, eugenol, citral, citronelle, borneol, linalool, geraniol, evening primrose, camphor, thymol, spirantol, penene, limonene and terpenoid oils; (j) polyhydric alcohols, for example, glycerine, sorbitol, propylene glycol, and the like; and polyols such as the polyethylene glycols, examples of which are: Polyox WSR-205 PEG 14M, Polyox WSR-N-60K PEG 45M, or Polyox WSR-N-750, and PEG 7M; (k) lipids such as cholesterol, ceramides, sucrose esters and pseudo-ceramides as described in European Patent Specification No. 556,957; (I) vitamins, minerals, and skin nutrients such as milk, vitamins A, E, and K; vitamin alkyl esters, including vitamin C alkyl esters; magnesium, calcium, copper, zinc and other metallic components; (m) sunscreens such as octyl methoxyl cinnamate (Parsol MCX) and butyl methoxy benzoylmethane (Parsol 1789); (n) phospholipids; and (o) anti-aging compounds such as alpha-hydroxy acids and beta-hydroxy acids. Skin benefit agents commonly account for up to 30 wt. % of the liquid soap formulation, with levels of from 0 to 25 wt. %, more particularly from 0 to 20 wt %, being typical of the levels at which those skin benefit agents generally known as "emollients" are employed in many of the subject formulations. Preferred skin benefit agents include fatty acids, hydrocarbons, polyhydric alcohols, polyols and mixtures thereof, with emollients that include at least one 012 to Ci fatty acid, petrolatum, glycerol, sorbitol and/or propylene glycol being of particular interest in one or more embodiments.

Bars can be manufactured by heating a mixer to about 80° C. to about 90° C., for example, 80° C. to adding the fatty acids, following by addition of caustic to form the precursor, followed by the addition of surfactant and other bar materials. The mixture is dried to a target moisture and then cooled. The cooled material is then extruded, made into billets, and pressed into bars.

A method of making cleansing bars can include heating the cleansing composition disclosed herein to a temperature sufficient to provide a molten composition, then cooling the molten composition to form flakes and/or chips, refining the flakes and/or chips to form billets, and stamping and/or cutting the billets to form the cleansing bars. The temperature to which the cleansing composition is heated is at least 100° C., for example, 100° C. to 120° C., for example, 105° C. to 120° C.

Another method of making a cleansing composition can include heating the cleansing composition disclosed herein to a temperature sufficient to provide a molten composition, pouring the molten composition into a mold, cooling the molten composition until the cleansing bars are formed, and removing the cleansing bars from the mold. The temperature to which the cleansing composition is heated is at least 100° C., for example, 100° C. to 120° C., for example, 105° C. to 120° C.

EXAMPLES

The following examples are merely illustrative of the cleansing compositions disclosed herein and are not intended to limit the scope hereof.

A batch process was used to create individual syndet base formulations. The basic procedure was to heat fatty acids to above their melting point, partially neutralize as needed, optionally dose in preformed soap, add required main surfactant and cosurfactants along with optional minor ingredients, heat until homogenous, dry to desired moisture then crystallize to room temperature for subsequent processing.

Subsequent processing includes steps to form base materials into a usable shape for evaluation purposes. It is deemed important that these formulations meet certain criteria for extrusion. Notably, the materials' hardness must be adequate in order to be compressed into a billet and optionally stamped into a bar. Hardness may be defined with a texture analyzer TA.XT Plus Texture Analyzer. Formulation examples shown herein, empirically correlate TAXT data and suitability for processing via extrusion. Five measurements per sample were taken and averaged. The measurement method requires a 30° cone with a penetration program test speed of 1.00 mm/sec over a distance of 10.00 mm utilizing a trigger force of 0.0050 kg. Temperature of the material was also recorded. A generally accepted range is that a material can be processed if it has a TAXT reading of 1000 to 4000.

A unique characteristic of this formulation space is its phase behavior. At mixing temperatures (defined as all materials being in a molten state) the formulation can exist as either a viscous dough or a thin, readily pourable, liquid. This phase behavior is advantageous because it allows for manufacturing flexibility. A dough at high temperature (i.e., above 100° C.) has the potential to be cooled in a conventional manner (flaking on chill roll, belt flaking, milling, etc.). A liquid at high temperature (i.e., above 100° C.) also has the potential for conventional cooling as just described but can additionally be processed via a melt cast procedure, in which the molten material is poured into a mold to cool.

For any ratio of ingredients within the cleansing compositions disclosed herein, the phase chemistry during mixing is determined by the amount of water in the formulation. For a given formulation, a dough consistency will always have a higher moisture content than its fluid counterpart, i.e., for a given formulation a phase transition based on water content can be identified. Conventional syndet manufacture requires enough moisture during mixing to make batches homogenous. Typically, batches will start at higher moistures than necessary and require drying to achieve a target moisture. It is during this part of the process that can determine if the formulation remains as a dough or is dried sufficiently to a phase transition in which a thin fluid is achieved. This phase transition is unique to each specific composition, but for all compositions there is a phase transition point below which the formulation will be a liquid, and above which the formulation will be a dough. For any composition which is cooled to a flake and extruded, requirements for extrusion (as discussed above) must be met.

Table 1 illustrates different ratios of materials and each unique water percentage content that can be defined as the phase transition point. Each formulation uses a "target" moisture of 7.5% water as a placeholder in the composition, but the actual water content of the batch determines the phase chemistry. All amounts are listed are measured in wt. %.

TABLE 1

| | SCI (%) | Cosurfactant (%) | Total Soap (%) | Total Fatty Acid (%) | Target Water (%) | Other (%) | Phase Transition (% Water) |
|---|---|---|---|---|---|---|---|
| Formula 1 | 32 | 3.9 | 18.6 | 33.6 | 7.5 | 4.4 | 5.1 |
| Formula 2 | 30 | 4.5 | 18.6 | 34.9 | 7.5 | 4.5 | 5.4 |
| Formula 3 | 30 | 3.9 | 18.6 | 35.6 | 7.5 | 4.4 | 6.8 |
| Formula 4 | 30 | 3.9 | 18.0 | 36.0 | 7.5 | 4.6 | 7.1 |
| Formula 5 | 30 | 3.9 | 16.5 | 38.3 | 7.5 | 3.8 | 7.4 |
| Formula 6 | 28 | 5.0 | 18.0 | 37.7 | 7.5 | 3.8 | 6.5 |
| Formula 7 | 28 | 4.5 | 18.6 | 37.1 | 7.5 | 4.3 | 7.9 |
| Formula 8 | 28 | 3.0 | 18.6 | 38.8 | 7.5 | 4.1 | 8.8 |

The selection of the present formulation space is defined by the below parameters:

Examples 1 and 8

A typical formulation within this space is defined in Example 1. Free fatty acids contributed the highest portion of the composition, but the material still presented sufficient hardness such that it can be processed via extrusion. The ratio of fatty acids to soap was 1.9. The procedure for making this formulation was as follows: heated stearic acid above its melting point to approximately 100° C., at which point sodium hydroxide solution was used to partially neutralize the stearic acid to give sodium stearate. When the mixture was homogeneous, the 90/10 soap was added and mixed at 100° C. to give a homogeneous solution. Sodium lauroyl isethionate (containing residual stearic and lauric acid) was then added and mixed above 100° C. to give a fluid composition. The cocamidopropyl betaine was then added and the mixture was heated above 100° C. to drive off excess moisture. The batch was complete when the target moisture was achieved, and the batch was then cooled and processed in one of the manners previously described herein. All subsequent examples were made in the manner just described with appropriate substitutions as per that example.

Example 1

| Composition | Weight % |
|---|---|
| Stearic Acid | 32.2 |
| Sodium Lauroyl Isethionate | 30 |
| Sodium Stearate | 12.4 |
| 90/10 Soap | 6.2 |
| Cocamidopropyl Betaine | 3.9 |

-continued

| Composition | Weight % |
|---|---|
| Lauric Acid | 3.4 |
| Water | 7.5 |
| Other | 4.4 |

TAXT: 2447 at 35.4° C.

In Example 1, the soap component was made up of sodium stearate, which was made in situ by partially neutralizing stearic acid, and premade soap noodles. The soap component need not be a combination of sodium stearate and soap noodles as shown in Example 8, in which the entirety of the soap consisted of sodium stearate.

Example 8

| Composition | Weight % |
|---|---|
| Stearic Acid | 32.1 |
| Sodium Lauroyl Isethionate | 30 |
| Sodium Stearate | 18 |
| Sodium Methyl Cocoyl Taurate | 3 |
| Lauric Acid | 4.2 |
| Water | 9 |
| Other | 3.7 |

TAXT: 1651; 32.2° C.

In Example 1, cocamidopropyl betaine was used as the cosurfactant, but the composition is by no means limited to this cosurfactant.

Examples 2-7

The following examples demonstrate how a variety of cosurfactants with very different chemical properties do not affect processing of the formulation. Combinations of cosurfactants may be used as well. The demonstration of using different surfactant/cosurfactant combinations can tailor lather attributes such as milkiness, creaminess, small vs large bubbles without significant impact on acceptable lather volume. Such attributes are generally assessed by one skilled in the art compared to a typical syndet anchor, such as DOVE.

Example 2

| Composition | Weight % |
|---|---|
| Stearic Acid | 38.2 |
| Sodium Lauroyl Isethionate | 25 |
| Sodium Stearate | 18.8 |
| Cocamidopropyl Betaine | 3 |
| Lauric Acid | 3.6 |
| Water | 6.5 |
| Other | 5.0 |

Example 3

| Composition | Weight % |
|---|---|
| Stearic Acid | 32.5 |
| Sodium Lauroyl Isethionate | 30 |
| Sodium Stearate | 12 |
| 90/10 Soap | 6 |
| Glycinate | 3.9 |
| Lauric Acid | 3.5 |
| Water | 7.5 |
| Other | 4.6 |

TAXT: 2375; 39.5° C.

Example 4

| Composition | Weight % |
|---|---|
| Stearic Acid | 34.6 |
| Sodium Lauroyl Isethionate | 28 |
| Sodium Stearate | 12 |
| 90/10 Soap | 6 |
| MES | 5 |
| Lauric Acid | 3.2 |
| Water | 7.5 |
| Other | 3.7 |

TAXT: 1208, 33.8° C.

Example 5

| Composition | Weight % |
|---|---|
| Stearic Acid | 32.2 |
| Sodium Lauroyl Isethionate | 30 |
| Sodium Stearate | 12 |
| 90/10 Soap | 6 |
| Sodium Methyl Cocoyl Taurate | 3.9 |
| Lauric Acid | 3.9 |
| Water | 7.5 |
| Other | 4.5 |

TAXT: 1739; 34.4° C.

Example 6

| Composition | Weight % |
|---|---|
| Stearic Acid | 32.8 |
| Sodium Lauroyl Isethionate | 30 |
| Sodium Stearate | 12 |
| 90/10 Soap | 6 |
| Cocamidopropyl Betaine | 3 |
| Sodium Methyl Cocoyl Taurate | 0.9 |
| Lauric Acid | 3.7 |
| Water | 7.5 |
| Other | 4.1 |

TAXT: 2179; 35.2° C.

Example 7

| Composition | Weight % |
|---|---|
| Stearic Acid | 32.2 |
| Sodium Lauroyl Isethionate | 30 |
| Sodium Stearate | 12 |
| 90/10 Soap | 6 |
| Cocamidopropyl Betaine | 3 |
| Sodium Methyl Cocoyl Taurate | 1.5 |
| Lauric Acid | 3.7 |
| Water | 7.5 |
| Other | 4.1 |

TAXT: 2996; 40.6° C.

Examples 9-12

The following examples demonstrate the potential to vary the level of the main active component, sodium lauroyl isethionate. In these systems total surfactant, cosurfactant, acid:soap amount and ratio impact phase transition based on water content.

Example 9

| Composition | Weight % |
|---|---|
| Stearic Acid | 38.2 |
| Sodium Lauroyl Isethionate | 25 |
| Sodium Stearate | 18.8 |
| Cocamidopropyl Betaine | 3 |
| Lauric Acid | 3.6 |
| Water | 6.5 |
| Other | 4.9 |

Example 10

| Composition | Weight % |
|---|---|
| Stearic Acid | 32.7 |
| Sodium Lauroyl Isethionate | 27 |
| Sodium Stearate | 18.8 |
| Sodium Methyl Cocoyl Taurate | 3 |
| Lauric Acid | 3.6 |
| Water | 10 |
| Other | 4.9 |

Example 11

| Composition | Weight % |
|---|---|
| Stearic Acid | 33.2 |
| Sodium Lauroyl Isethionate | 30.1 |
| Sodium Stearate | 12 |
| 90/10 Soap | 6.8 |
| Cocamidopropyl Betaine | 3 |
| Lauric Acid | 3.6 |
| Water | 6.5 |
| Other | 4.8 |

TAXT: 2499; 38.2° C.

Example 12

| Composition | Weight % |
|---|---|
| Stearic Acid | 30.1 |
| Sodium Lauroyl Isethionate | 32 |
| Sodium Stearate | 12.45 |
| 90/10 Soap | 6.2 |
| Cocamidopropyl Betaine | 3 |
| Lauric Acid | 3.6 |
| Water | 7.5 |
| Other | 5.15 |

TAXT: 3610; 41.7° C.

Examples 13-21

The remaining compositions further demonstrate the ability to modify levels of fatty acid, sodium lauroyl isethionate, soap, and cosurfactant. It is noted that the compositions of these examples were all processable formulas in terms of their TAXT value, meaning that they compositions can be made into bars.

Example 13

| Composition | Weight % |
|---|---|
| Stearic Acid | 34 |
| Sodium Lauroyl Isethionate | 28 |
| Sodium Stearate | 12.4 |
| 90/10 Soap | 6.2 |
| Cocamidopropyl Betaine | 4.5 |
| Lauric Acid | 3.5 |
| Water | 7.5 |
| Other | 3.9 |

TAXT: 2246; 36.0° C.

Example 14

| Composition | Weight % |
|---|---|
| Stearic Acid | 34.6 |
| Sodium Lauroyl Isethionate | 28 |
| Sodium Stearate | 12.4 |
| 90/10 Soap | 6.2 |
| Cocamidopropyl Betaine | 3.9 |
| Lauric Acid | 3.5 |
| Water | 7.5 |
| Other | 3.9 |

TAXT: 2452; 35.2° C.

Example 15

| Composition | Weight % |
|---|---|
| Stearic Acid | 35.7 |
| Sodium Lauroyl Isethionate | 28 |
| Sodium Stearate | 12.4 |
| 90/10 Soap | 6.2 |

-continued

| Composition | Weight % |
| --- | --- |
| Cocamidopropyl Betaine | 3 |
| Lauric Acid | 3.5 |
| Water | 7.5 |
| Other | 3.7 |

TAXT: 2065; 33.4° C.

Example 16

| Composition | Weight % |
| --- | --- |
| Stearic Acid | 34.3 |
| Sodium Lauroyl Isethionate | 30.5 |
| Sodium Stearate | 18.3 |
| Sodium Methyl Cocoyl Taurate | 2 |
| Lauric Acid | 3.4 |
| Water | 7.5 |
| Other | 4 |

Example 17

| Composition | Weight % |
| --- | --- |
| Stearic Acid | 32.7 |
| Sodium Lauroyl Isethionate | 30 |
| Sodium Stearate | 16.2 |
| 90/10 Soap | 1.8 |
| Sodium Methyl Cocoyl Taurate | 3 |
| Lauric Acid | 3.4 |
| Water | 9 |
| Other | 3.9 |

TAXT: 2731; 35.2° C.

Example 18

| Composition | Weight % |
| --- | --- |
| Stearic Acid | 33.2 |
| Sodium Lauroyl Isethionate | 30.1 |
| Sodium Stearate | 15 |
| 90/10 Soap | 3.8 |
| Cocamidopropyl Betaine | 3 |
| Lauric Acid | 3.6 |
| Water | 6.5 |
| Other | 4.8 |

TAXT: 2867; 38.4° C.

Example 19

| Composition | Weight % |
| --- | --- |
| Stearic Acid | 30 |
| Sodium Lauroyl Isethionate | 32 |
| Sodium Stearate | 12.4 |
| 90/10 Soap | 6.2 |
| Cocamidopropyl Betaine | 3.9 |
| Lauric Acid | 3.6 |

-continued

| Composition | Weight % |
| --- | --- |
| Water | 7.4 |
| Other | 4.5 |

TAXT: 3064; 39.3° C.

Example 20

| Composition | Weight % |
| --- | --- |
| Stearic Acid | 31.5 |
| Sodium Lauroyl Isethionate | 30 |
| Sodium Stearate | 12.4 |
| 90/10 Soap | 6.2 |
| Cocamidopropyl Betaine | 4.5 |
| Lauric Acid | 3.4 |
| Water | 7.5 |
| Other | 4.5 |

TAXT: 2652; 37.0° C.

Example 21

| Composition | Weight % |
| --- | --- |
| Stearic Acid | 35 |
| Sodium Lauroyl Isethionate | 30 |
| Sodium Stearate | 11 |
| 90/10 Soap | 5.5 |
| Sodium Methyl Cocoyl Taurate | 3.9 |
| Lauric Acid | 3.4 |
| Water | 7.5 |
| Other | 3.7 |

TAXT: 1831; 33.1° C.

Examples 22 to 25

In these examples, the active component was varied as well as the fatty acid:soap ratio. Example 23 contained a fatty acid:soap ratio of 1:1, while Examples 22, 24, and 25 had a fatty acid to soap ratio of 1.8:1. The active component amounts were varied between sodium lauroyl isethionate, stearic acid, and a combination of soap noodle and sodium stearate. All components amounts are listed as weight percent.

Data was collected from a 7-day Forearm Controlled Application Test (FCAT). All measurements were taken in the afternoon on day 7. SKICON was measured as the area under the curve. TEWL was measured as the change from the baseline. The index was measured as SKICON/TEWL. Higher SKICON values are desired, and lower TEWL values, while a higher value for the Index is more desired than a lower value.

Examples 22-25

| Example # | SLI* | Stearic Acid | Soap Noodle & Sodium Stearate | FA:Soap | SKICON | TEWL | Index |
|---|---|---|---|---|---|---|---|
| 22 | 54% | 19% | 10.5% | 1.8:1 | 157.33 | 4.76 | 33.05 |
| 23 | 38% | 22% | 22% | 1:1 | 98.23 | 4.89 | 20.08 |
| 24 | 30% | 32% | 18% | 1.8:1 | 271.26 | 4.27 | 63.52 |
| 25 | 30% | 32% | 18% | 1.8:1 | 199.07 | 4.25 | 46.84 |

*SLI = Sodium Lauroyl Isethionate

A typical response to improve overall performance would be to reduce the amount of active (i.e., reducing synthetic detergent level). Reduction of the active level can help with milder formulations that are less damaging to the consumer's skin. This was done in Examples 22 and 23, where the amount of SLI was reduced from 54% to 38%, but the ratio of fatty acid to soap was changed from 1.8:1 to 1:1. As seen in the results, the ratio of fatty acid to soap plays a role in achieving the desired results. SKICON, TEWL, and Index values all suffered when the amount of active was lowered and the fatty acid to soap ratio was not taken into consideration. Stated more simply, merely reducing active but not maintaining effective fatty acid to soap ratio will not result in a clinically improved bar formulation. It was unexpectedly found that by reducing the amount of active in the composition and balancing structuring systems (i.e., the fatty acid to soap ratio), mild, well lathering, consumer acceptable formulations can be innovated.

It is noted that with respect to the cleansing compositions and methods of making disclosed herein, except where otherwise explicitly indicated, all numbers in this description indicating amounts of material or conditions of reaction, physical properties of materials and/or use are to be understood as modified by the word "about." All amounts are by weight of the final composition, unless otherwise specified.

It should be noted that in specifying any range of concentration or amount, any particular upper concentration can be associated with any particular lower concentration or amount as well as any subranges consumed therein. In that regard, it is noted that all ranges disclosed herein are inclusive of the endpoints, and the endpoints are independently combinable with each other (e.g., ranges of "up to 25% by weight, or, more specifically, 5% by weight to 20% by weight, in inclusive of the endpoints and all intermediate values of the ranges of 5% by weight to 25% by weight, etc.). "Combination is inclusive of blends, mixtures, alloys, reaction products, and the like.

Furthermore, the terms "first", "second", and the like herein do not denote any order, quantity, or importance, but rather are used to distinguish one element from another. The terms "a" and "an" and "the" herein do not denote a limitation of quantity and are to be construed to cover both the singular and the plural, unless otherwise indicated herein or clearly contradicted by context. The suffix "(5)" as used herein is intended to include both the singular and the plural of the term it modifies, thereby including one or more of the term (e.g., the film(s) includes one or more films). Reference throughout the specification to "one embodiment", "one aspect", "another embodiment", "another aspect", "an embodiment", "an aspect" and so forth means that a particular element (e.g., feature, structure, and/or characteristic) described in connection with the embodiment or aspect is included in at least one embodiment or aspect described herein and may or may not be present in other embodiments or aspects. In addition, it is to be understood that the described elements may be combined in any suitable manner in the various embodiments or aspects.

All cited patents, patent applications, and other references are incorporated herein by reference in their entirety. However, if a term in the present application contradicts or conflicts with a term in the incorporated reference, the term from the present application takes precedence over the conflicting term from the incorporated reference. While particular aspects have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications, variations, improvements, and substantial equivalents.

For the avoidance of doubt the word "comprising" is intended to mean "including" but not necessarily "consisting of" or "composed of." In other words, the listed steps, options, or alternatives need not be exhaustive.

The disclosure of the invention as found herein is to be considered to cover all aspects as found in the claims as being multiply dependent upon each other irrespective of the fact that claims may be found without multiple dependency or redundancy. Unless otherwise specified, numerical ranges expressed in the format "from x to y" are understood to include x and y. In specifying any range of values or amounts, any particular upper value or amount can be associated with any particular lower value or amount. All percentages and ratios contained herein are calculated by weight unless otherwise indicated. The various features of the present invention referred to in individual sections above apply, as appropriate, to other sections mutatis mutandis. Consequently, features specified in one section may be combined with features specified in other sections as appropriate. Any section headings are added for convenience only and are not intended to limit the disclosure in any way.

The invention claimed is:

1. A cleansing composition, comprising:

25% to 35% by weight of a surfactant;

1.5% to 5% by weight of a co-surfactant;

5% to 9% by weight of water; and

50% to 60% by weight of a fatty acid and soap mixture, wherein the fatty acid to soap ratio is 2.3:1 to 1.8:1, wherein the fatty acid is selected from lauric acid, myristic acid, palmitic acid, stearic acid, behenic acid, oleic acid, linoleic acid, lanolic acid, isostearic acid, arachidonic acid, hydroxystearic acid, or a combination thereof;

wherein the soap comprises a mixture of lauric acid and an acid selected from myristic acid, palmitic acid, stearic acid, behenic acid, oleic acid, linoleic acid, lanolic acid, isostearic acid, arachidonic acid, hydroxystearic acid, or a combination thereof; and wherein lauric acid is present in an amount of 80% by weight in the fatty acid and soap mixture.

2. The cleansing composition of claim 1, wherein the surfactant is cocamidopropyl hydroxysultaine, cocamido sulfosuccinate, sodium lauroyl isethionate, or a combination thereof.

3. The cleansing composition of claim 1, wherein the surfactant is present in an amount of 25% to 32% by weight.

4. The cleansing composition of claim 1, wherein the co-surfactant comprises cocamidopropyl betaine, sodium methyl cocoyl taurate, sodium cocoyl glycinate, methyl ester sulfonate, fatty acid ester sulfonate.

5. The cleansing composition of claim 1, wherein the soap is a neutralized fatty acid.

6. The cleansing composition of claim 5, wherein the neutralized fatty acid is selected from lauric acid, myristic acid, palmitic acid, stearic acid, behenic acid, oleic acid, linoleic acid, lanolic acid, isostearic acid, arachidonic acid, hydroxystearic acid, or a combination thereof.

7. A method of making cleansing bars, comprising:

heating the cleansing composition of claim 1 to a temperature to form provide a molten composition;

cooling the molten composition to form flakes and/or chips;

refining the flakes and/or chips to form billets; and stamping and/or cutting the billets to form the cleansing bars.

8. The method of claim 7, wherein the cleansing composition is heated to a temperature of at least 100° C.

9. The method of claim 7, wherein the billets have a TAXT reading of 1000 to 4000.

10. A method of making cleansing bars, comprising:

heating the cleansing composition of claim 1 to a temperature to form provide a molten composition;

pouring the molten composition into a mold;

cooling the molten composition until the cleansing bars are formed; and removing the cleansing bars from the mold.

11. The method of claim 10, wherein the cleansing composition is heated to a temperature of at least 100° C.

12. The cleansing composition of claim 1, wherein the fatty acid is selected from stearic acid, palmitic acid, or a combination thereof.

13. The cleansing composition of claim 2, wherein the surfactant is sodium lauroyl isethionate, cocamido sulfosuccinate, or a combination thereof.

14. The cleansing composition of claim 3, wherein the surfactant is present in an amount of 26% to 32% by weight.

15. The cleansing composition of claim 5, wherein the soap is salts of aliphatic alkane-or alkene monocarboxylic fatty acids.

16. The cleansing composition of claim 5, comprising 6 to 22 carbon atoms.

17. The cleansing composition of claim 6, wherein the fatty acid is selected from stearic acid, palmitic acid, or a combination thereof.

18. The cleansing composition of claim 1, wherein the lauric acid is present in an amount of 85% by weight in the fatty acid and soap mixture.

* * * * *